United States Patent [19]

Porter et al.

[11] Patent Number: 5,318,207
[45] Date of Patent: Jun. 7, 1994

[54] METHOD AND APPARATUS FOR PORTABLE DISPENSING OF FOAM MATERIAL

[75] Inventors: George O. Porter, Amherst; Gary M. Wasch, Brecksville; Scott T. Cornman, Avon, all of Ohio

[73] Assignee: Nordson Corporation, Westlake, Ohio

[21] Appl. No.: 871,020

[22] Filed: Apr. 20, 1992

[51] Int. Cl.5 .............................................. B65D 83/14
[52] U.S. Cl. .................................. 222/387; 222/389; 222/394
[58] Field of Search .............. 222/351, 361, 389, 396, 222/397, 399, 387, 394; 141/2, 3

[56] References Cited

U.S. PATENT DOCUMENTS

| | | | |
|---|---|---|---|
| 1,169,524 | 1/1916 | Baker | 222/387 |
| 1,224,914 | 5/1917 | Field et al. | 222/387 |
| 1,630,899 | 5/1927 | Lynch | 222/387 |
| 2,004,664 | 6/1935 | Krannak | 222/387 |
| 2,788,926 | 4/1957 | Morrison | 222/394 |
| 2,818,999 | 1/1958 | Miller | 222/387 |
| 3,136,456 | 6/1964 | Sherbondy | 222/389 |
| 3,138,303 | 6/1964 | Hoveland | 222/387 |
| 3,790,039 | 2/1974 | Zucconi | 222/394 |
| 3,804,299 | 4/1974 | Kain | 222/394 |
| 3,843,586 | 10/1974 | Wolf . | |
| 3,980,209 | 9/1976 | Collar | 222/389 |
| 4,059,714 | 11/1977 | Scholl et al. . | |
| 4,144,913 | 3/1979 | Akers et al. | 141/2 |
| 4,651,503 | 3/1987 | Anderson, III et al. | 141/2 |
| 4,778,631 | 10/1988 | Cobbs, Jr. et al. . | |
| 4,877,157 | 10/1989 | Savlle | 222/387 |
| 4,932,094 | 6/1990 | McCowin | 222/387 |
| 5,150,820 | 9/1992 | McGill | 222/387 |

FOREIGN PATENT DOCUMENTS

91/2934  4/1991  South Africa .

OTHER PUBLICATIONS

Sika BulkFoam product brochure, dated Mar. 1990.
Geocel expanding and foam sealants product brochure, undated.

Primary Examiner—David M. Mitchell
Assistant Examiner—Stephen P. Avila
Attorney, Agent, or Firm—Rankin, Hudak & Hill

[57] ABSTRACT

A pressurized solution of a material with a dissolved gas is maintained and dispensed in a system that allows the material can be dispensed as a foam at any location. The system is portable and avoids the need for a large mixing apparatus at the location. The system includes a portable container having a movable member defining an expandable chamber. The chamber is filled the material/gas solution from a pressurized source of solution which may be at another location. Force is maintained on the movable member to keep the material/gas solution under pressure. The material/gas solution is maintained under pressure in the container to avoid premature foaming of the solution by the maintaining force on the movable member. The force can be provided in various ways, including the use of a predetermined amount of fluid in the container on the other side of the movable member from the chamber or the use of an external source of pressurized fluid. The material/gas solution is discharged from the container and dispensed using a gun to atmospheric pressure to release the gas and form a foam.

30 Claims, 5 Drawing Sheets

METHOD AND APPARATUS FOR PORTABLE DISPENSING OF FOAM MATERIAL

BACKGROUND OF THE INVENTION

1. Field of the Invention

This invention relates to systems for dispensing foam material, and more particularly to systems which maintain the material under pressure with foaming gas in solution and which dispense the material/gas solution to form the foam.

2. Description of the Prior Art

The assignee of the present invention had developed methods and apparatus for dispensing high-performance sealants that are foamed in place, creating closed-cell foam seals that act as effective, long-lasting barriers against air, dust, vapor and fluids in various applications. The sealant may be any pumpable material, such as polyurethane, silicone or plastisol and is usually a curable polymeric sealant material which has a very high viscosity. Using this foam-in-place technology a gas that is inert to the sealant material is mixed with the sealant material under high pressure to dissolve the gas in a solution, and the solution is maintained under high pressure to prevent the gas from escaping or from prematurely foaming the material. The material/gas solution is then dispensed from a nozzle at atmospheric pressure, allowing the gas to come out of solution and foam the sealant material. This technology produces a foam without any chemical reaction, without any chemical blowing agent and without any volatiles. It allows for a reduction in the use of expensive materials such as polyurethanes and silicones and provides improved compressibility, resilience and reduced cure time.

It is difficult to successfully mix the low viscosity foaming gas with the highly viscous sealant material so as to achieve a uniform solution without creating undesirable heat and other problems. Many of these difficulties have been solved by using a bulk mixer and associated apparatus as described in U.S. Pat. No. 4,778,631. The mixing may be accomplished by a disk mixer that thoroughly mixes the low viscosity foaming gas into the high viscosity material. The mixer may be driven by a constant speed motor, which is monitored by a torque sensor. The mixing apparatus may also require a bulk melter for the material that is fed to the mixer, a cooling system with a supply of cooling fluid, and a pressurized supply of foaming gas including a pump. This apparatus is relatively large and bulky, and it is not portable, but it is advantageously used in large-scale production facilities to produce foam sealant which can be applied by robotic devices, replacing the old, labor-intensive manual method of applying die-cut gaskets. The apparatus uniformly blends the foaming gas with curable sealant materials to produce high-performance gaskets. Automated foam-in-place gasketing increases production, reduces labor and material costs, and improves quality through accurate and consistent gasket placement.

These highly desirable gasketing systems would also prove beneficial outside of the large-scale production facilities. For example, the foam-in-place gasketing material could be advantageously used on site at building installations, to provide high quality gaskets around windows and in other parts of building construction. The use of foam-in-place gasketing systems outside of large-scale production facilities, however, has been hindered by the requirements of the large mixing apparatus that is needed to produce the pressurized material/gas solution. In order to apply this foam sealant material on site, it would be necessary to supply a large mixing apparatus in close proximity to the location where the sealant was being applied. On most construction sites, the worker is moving from one location to another, for example, applying sealant material a various windows located throughout the site, and it would be impractical for the worker to move the large mixing apparatus with him in order to utilize foam-in-place sealant technology and to produce the improved sealing gaskets that this technology provides.

SUMMARY OF THE INVENTION

The present invention provides a method and apparatus for using the foam-in-place sealant technology without the necessity of a nearby mixing apparatus. The invention allows a user to utilize high performance foam-in-place sealants without the need for constant attachment to the large mixing apparatus. Using the method and apparatus of the invention, foam sealants can be applied in any location, and the restrictions on use of the foam gasketing technology in large-scale production facilities are eliminated.

With the present invention, the material/gas solution used to make the foam sealant can be maintained and used in a highly portable system that can be used virtually anywhere without regard to the location of the mixing apparatus. The material/gas solution can be dispensed using a convenient hand-held gun directly onto a part in any location. Foam-in-place gasketing material can be applied anywhere without regard to power requirements or other needs in a completely self-contained system. This system can be modified to increase the supply of material/gas solution through connection to a pressurized source of air or gas or through intermittent connection to a supply of material/gas solution, such as a mixing apparatus.

These and other advantages are provided by the present invention of a method and apparatus for dispensing a foam. The method comprises the steps of supplying a pressurized source of a material containing gas in solution, providing a portable container having a movable member defining an expandable chamber, maintaining a force on the movable member, filling the chamber with the material/gas solution from the source, maintaining the material/gas solution under pressure in the container to avoid premature foaming of the solution by the utilization of the force on the movable member, discharging the material/gas solution from the container, and dispensing the solution at atmospheric pressure to release the gas forming a foam. The apparatus comprises a pressurized source of a material containing gas in solution, a portable container having a movable member defining an expandable chamber means for connecting the container to the source to fill the chamber with the material/gas solution, means for maintaining a force on the movable member and for maintaining the material/gas solution under pressure in the expandable chamber to avoid premature foaming of the solution, means for dispensing the solution from the container and allowing the solution to reach atmospheric pressure to release the gas and form a foam.

DETAILED DESCRIPTION OF THE PREFERRED EMBODIMENTS

Various embodiments of the apparatus of the present invention used to practice the method of the present invention are shown in FIGS. 1–6. The embodiment of FIG. 1 will be described using reference numbers 100–199, the embodiment of FIG. 2 will be described using reference numbers 200–299, the embodiment of FIG. 3 will be described using reference numbers 300–399, and so forth. Unless otherwise noted, the elements designated by reference numbers having the same last two digits are similar or identical. For example, element 289 in the embodiment of FIG. 2 would be similar or the same as element 189 in the embodiment of FIG. 1.

Figure 1:
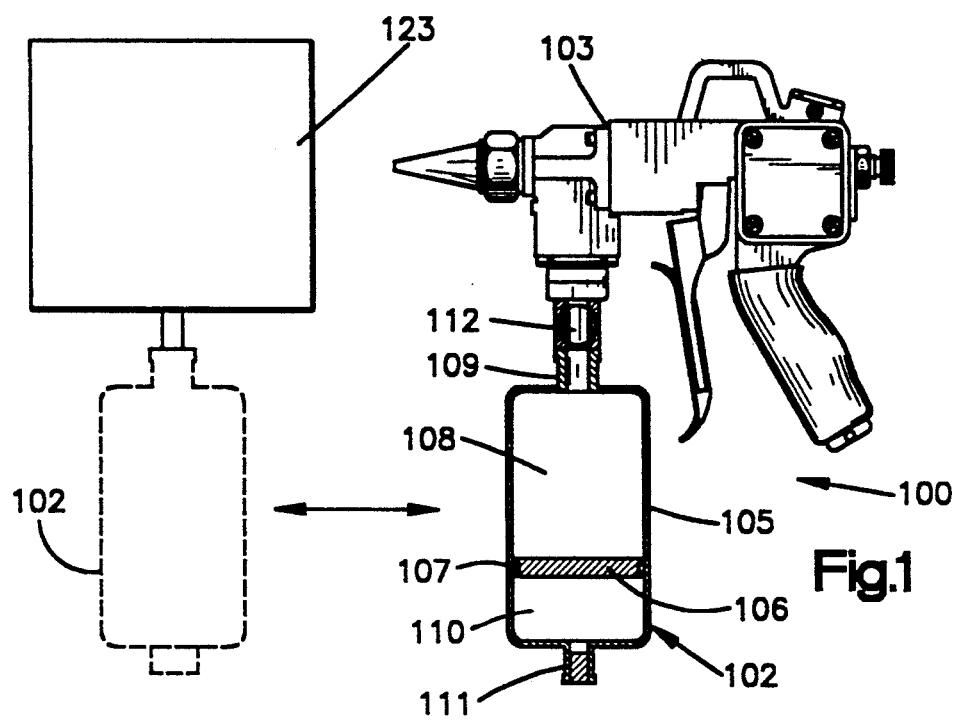
FIG. 1 is a schematic diagram of one embodiment the system of the present invention.

In FIG. 1, a system 100 comprises a cartridge 102 which contains a solution of the material to be foamed with a foaming gas. In the application of the present invention to the dispensing of foam sealant material, the cartridge 102 could contain a solution of a viscous sealant material, such as silicone, with a gas that is inert to the sealant material, such as nitrogen, under pressure. As shown in FIG. 1, the cartridge 102 is removably attached to a dispensing head 103 which is mounted thereon and connected thereto. A plurality of cartridges 102 can be provided to provide a sufficient supply of foam. As each cartridge 102 runs out of material, it can be removed from the dispensing head 103 and replaced with a filled cartridge so that application of the foam can continue.

Each cartridge 102 comprises an outer housing or cylinder 105 having an inner movable member or piston 106. The piston 106 can move axially within cylinder 105, and it sealingly engages the inner walls of the cylinder by means of a suitable sealing arrangement, such as O-rings 107. A chamber 108 is formed on one side of the piston 106, and this chamber 108 is filled with the material/gas solution. A port 109 is provided in the chamber 108 and this port provides an inlet means for filling the chamber with solution and provides an outlet means for discharging the solution from the chamber. While the cartridge 102 shown has a single port 109, providing both the inlet and outlet means, more than one port may be provided with one port providing the inlet means and another port providing the outlet means.

As the piston 106 moves within the cylinder 105, the size of the chamber 108 is increased or decreased to allow the pressure of the material/gas solution in the chamber 108 to be maintained to keep the gas in solution. To maintain this pressure, force is exerted on the piston 106 against the material/gas solution in the chamber 108. This force is preferably provided by pressure exerted on the piston within a chamber 110 formed in the cylinder 105 on the other side of the piston 106.

In the system 100, the chamber 110 contains a predetermined amount of compressible fluid that is sealed in the chamber 110 and exerts force on the piston 106 as it is compressed. Preferably, a relatively inert gas, such as nitrogen, or dry air is used as the fluid in chamber 110. A port 111 is provided on the end of the cylinder 105 for the introduction of the gas into the chamber 110. After the desired amount of gas has been introduced into the chamber 110, the port 111 is sealed to prevent the escape of the gas. Since the pressure in the chamber 110 must always be higher than the soluablity pressure of the material/gas solution in the chamber 108 so that the solution is maintained, the desired amount of gas that is introduced into the chamber 110 must be sufficent at least to produce this pressure when the piston 106 is in its uppermost position and the chamber 110 is fully expanded.

The material/gas solution is discharged from the chamber 108 through the port 109 that provides the outlet means in the cartridge 102. At the port 109 is a valve 112 which can be closed to hold the solution in the cartridge 102 and which is opened when the solution is discharged.

Figure 7:
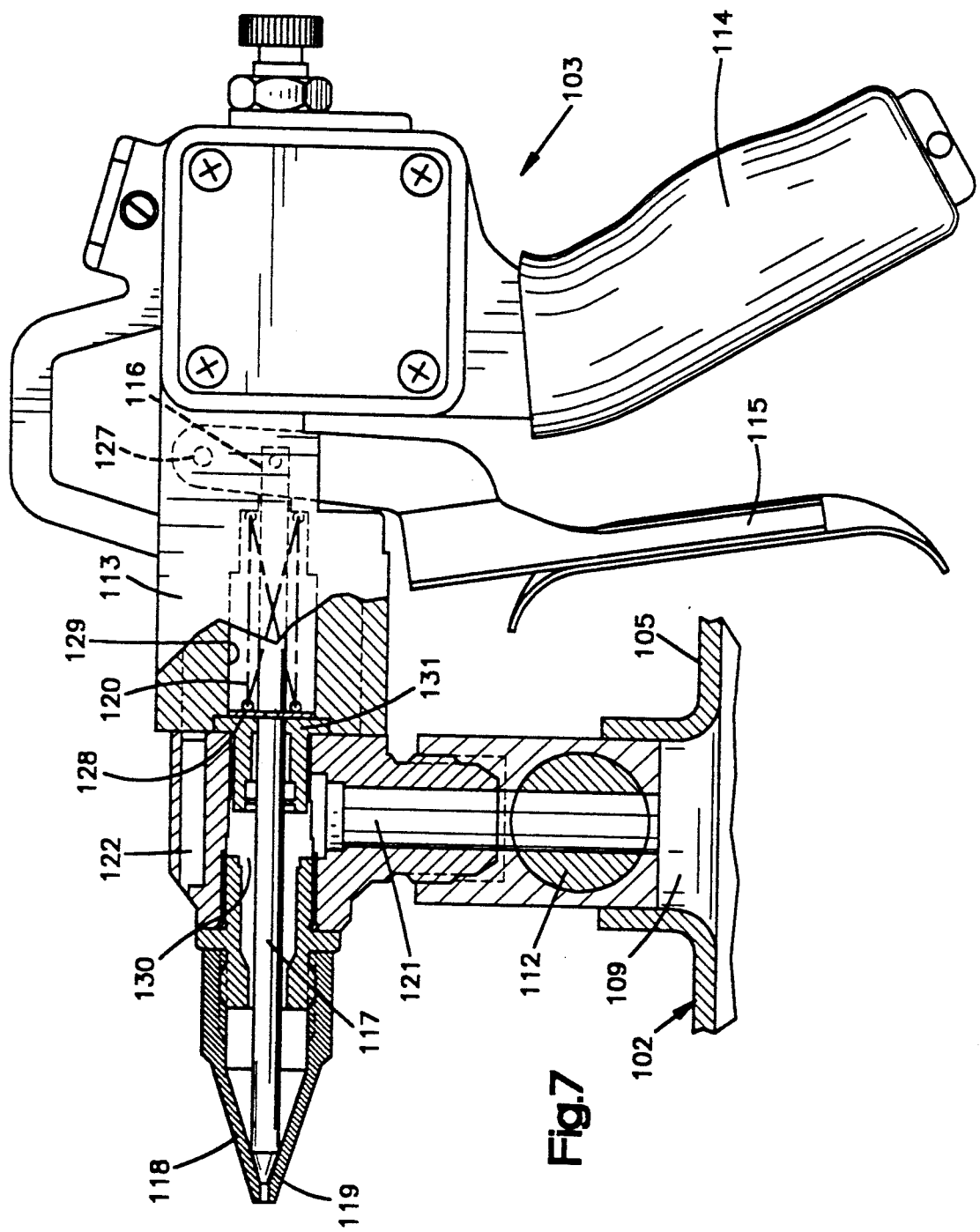
FIG. 7 is a detailed side elevational view, partially sectioned, of the dispensing head of the embodiment of FIG. 1.

The port 109 is connected through the valve 112 to the dispensing head 103 which may be a suitable manually actuatable hand gun 113, such as the Nordson Model A1 hand gun with suitable inlet modification to receive the cartridge 102. The dispensing gun 113, which is shown in more detail in FIG. 7, includes a handle 114 which allows the gun to easily gripped by the user, and a trigger 115 which can be actuated to open the gun 113 and allow the solution to flow through the dispensing head. The trigger 115 is pivotally mounted to the body of the gun at 127 and is pivotally connnected at a location 116 below the mounting 127 to an actuating rod 117 which extends longitudinally through the gun 113 to an exit nozzle 118. The forward end of the actuating rod 117 opposite the pivot arrangement 6 comprises a conical tip 119 which sealingly engages the nozzle 118 to close nozzle and stop the flow of solution from the gun. The actuating rod 117 has a washer 128 that engages a spring 120 which is mounted in a spring chamber 129. The spring urges the tip 119 at the end of the actuating rod toward the nozzle 118 to close the flow.

The solution enters the gun 113 from the cartridge 102 through a port 121 which communicates with the cartridge port 109 and the valve 112. The port 121 connects with a flow chamber 130 which extends through the barrel of the gun and through which the actuating rod 117 extends. The flow chamber 130 extends from the nozzle 118 toward the spring chamber 129 and is separated from the spring chamber by a plug 131 carried on the actuating rod 117 adjacent to the flange 128. As the user actuates the trigger 115, the tip 119 is moved axially away from the nozzle 118 in opposition to the spring 120 to open the flow path and allow the solution from the cartridge 102 to flow through the port 121, into the chamber 130 and through the nozzle 118. As the pressurized fluid reaches atmospheric pressure, the dissolved gas in the solution causes the material to foam.

The gun 113 may also include one or more heating elements 122 which may be used if the system of the present invention is being used to dispense material which must remain at an elevated temperature while being dispensed, such as adhesive materials. If the system is used to dispense sealants or other materials that can be dispensed at normal ambient temperatures, the presence of heating elements in the gun is unnecessary.

Each cartridge 102 is filled with material/gas solution from a source 123 of solution such as the Nordson Foammix ® system. The source 123 may be situated at a location distant from the location in which the foam is being applied, providing complete portability for the dispensing system. After each cartridge 102 is used, the empty cartridge may be returned to the location of the source 123 for refilling and re-use.

Before each cartridge 102 is filled with material/gas solution at the location of the supply source 123, the chamber 110 is filled with a predetermined amount of gas through the port 111, and the port 111 is sealed closed. The cartridge 102 is then filled with the material/gas solution through the port 109. As the cartridge 102 is filled with the pressurized solution, the piston 106 moves to increase the volume of the chamber 108 and to decrease the Volume of the chamber 110, increasing the pressure of the trapped gas in the chamber 110. When the cartridge 102 has been sufficiently charged with solution, the piston 106 has been moved to expand the chamber 108, and the gas in the chamber 110 is compressed to the desired limit. The amount of compression of the gas in the chamber 110 depends upon the design of the cylinder 105 and the amount of pressure that can be maintained in the cartridge without rupture. The valve 112 is then closed, and the cartridge 102 is ready for use.

After filling, the cartridges 102 are individually attached to a dispensing head 103 and can be used at any location to dispense foam. As each cartridge 102 is used, the pressurized gas trapped in the chamber serves to force the solution from the chamber 108 and into the dispensing gun 113 as the user actuates the trigger 115. Each cartridge 102 continues to be used until the piston 106 in the cartridge has moved to the end of the cylinder 105 adjacent to the port 109 and all of the solution in the chamber 108 is discharged. The cartridge 102 can then be removed from the dispensing head 103 and replaced with a full cartridge. The cartridge 102 is removed from the dispensing head 103 by disconnecting the cartridge from the dispensing head 103, leaving a small residual of material in the port 121 and nozzle 118 of the dispensing head. A full cartridge is then connected to the dispensing head 103, and the valve 112 of the full cartridge is opened to allow the solution to flow into the dispensing head. As the solution from the new cartridge 102 enters the dispensing head 103, it purges the residual foamed material which remained in the port 121 and nozzle 118 when the last cartridge was removed.

To avoid purging the dispensing head each time a new cartridge is used, the material/gas solution can be dispensed from the cartridge 102 until the pressure in the chamber 108 approaches the soluability pressure necessary to maintain the gas in solution, and before the chamber 108 is completely emptied. The dispensing of the material/gas solution from the chamber 108 is halted by any suitable means, such as a check valve in place of the valve 112 which stops the flow of solution from the chamber 108 when the pressure drops below a predetermined pressure level which is safely above the soluability pressure. Alternatively, a position sensor could be provided within the cartridge to sense the appropriate postion of the piston 106. When the flow of material/gas solution is halted, the cartridge 102 is removed from the dispensing head 103 after the valve 112 is closed. An additional valve (not shown) which may be provided in the port 121 of the dispensing head is also closed. While the additional valve may be closed manually, this valve is preferably a check valve which also automatically closes when the pressure of the material/gas solution in the dispensing head 103 nears the soluability pressure necessary to maintain the gas in solution. The cartridge 102 is then removed from the dispensing head 103, leaving a small amount of pressurized material/gas solution in the port 121 and nozzle 118 of the dispensing head. The spent cartridge 102 is then replaced with a full cartridge, the valve 112 and the valve in the port 121 of the dispensing head are opened to allow the soultion to flow through the dispensing head 103 upon actuation of the trigger 115.

Figure 8:
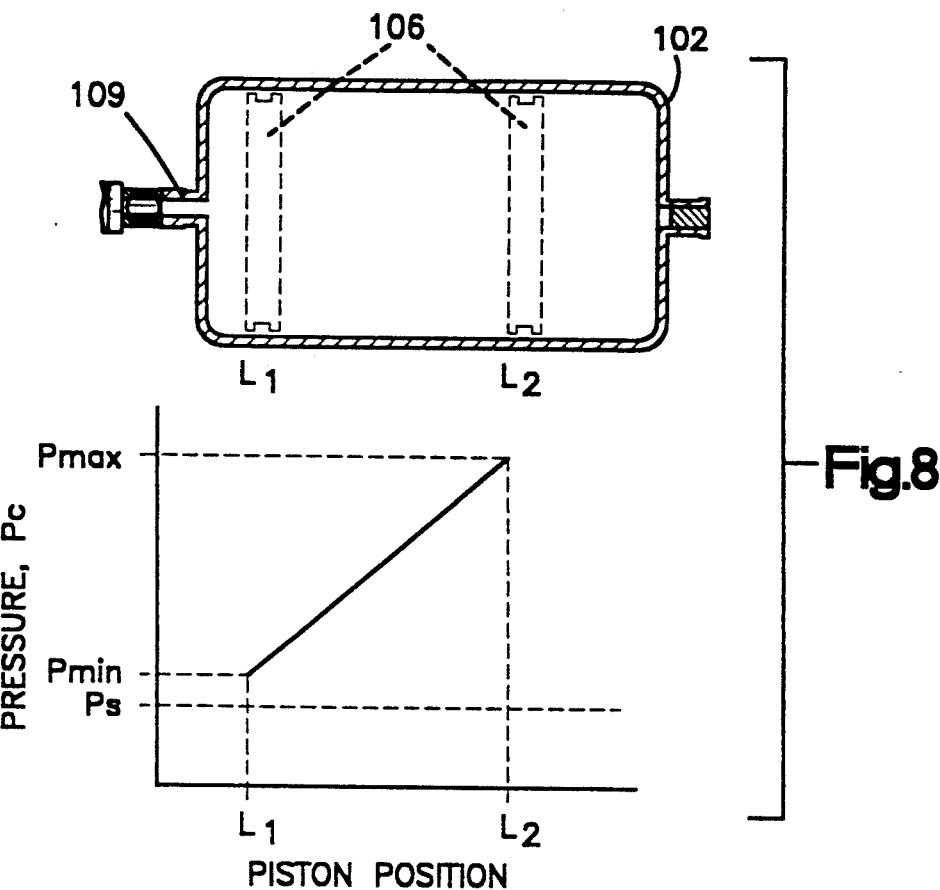
FIG. 8 is a graph showing the effect of filling the cartridges or containers for the embodiments of FIGS. 1, 3 and 5.

The effect of the pressure in the chamber 110 can be seen with reference to FIG. 8. The pressure of the material/gas solution in the chamber 108 is represented by $P_c$. The pressure in the chamber 110 is also approximately $P_c$ since the piston 106 is movable within the cylinder 105 and tends to allow the pressure between the chambers 108 and 110 to approach equilibrium. Before the cartridge 102 is charged with solution, the chamber 108 is at a minimal volume with the piston at position $l_1$, and the chamber 108 contains a minimal amount of solution at a pressure $P_{min}$. It is important that $P_{min} > P_2$, where $P_s$ is the pressure required to maintain the foaming gas in the material/gas solution. As the chamber 108 fills with solution, the chamber 108 increases in volume, and the piston 106 moves from position $l_1$ toward position $l_2$. The chamber 110 decreases in volume, and the pressure of the gas in the chamber 110 rises from $P_{min}$ to $P_{max}$. The piston 106 cannot move all the way to position $l_3$ because the minimal volume of the chamber 110 must be large enough to contain the gas at pressure $P_{max}$ without rupturing the cartridge 102. During dispensing, solution is discharged from the chamber 108, the volume in the chamber 108 decreases, and the piston moves from position $l_2$ to position $l_1$. The pressure in the chamber 108 decreases from $P_{max}$ to $P_{min}$. Throughout this process, $P_c > P_s$, so that the material/gas solution is maintained under sufficient pressure to keep the foaming gas in solution.

The cartridge 102 of FIG. 1 is small enough and portable enough to be easily carried along with the dispensing head 103 by the user. However, because of its relatively small size, it is capable of holding a relatively small amount of material/gas solution. After each cartridge 102 runs out of solution, it must be replaced with a fresh cartridge.

Figure 2:
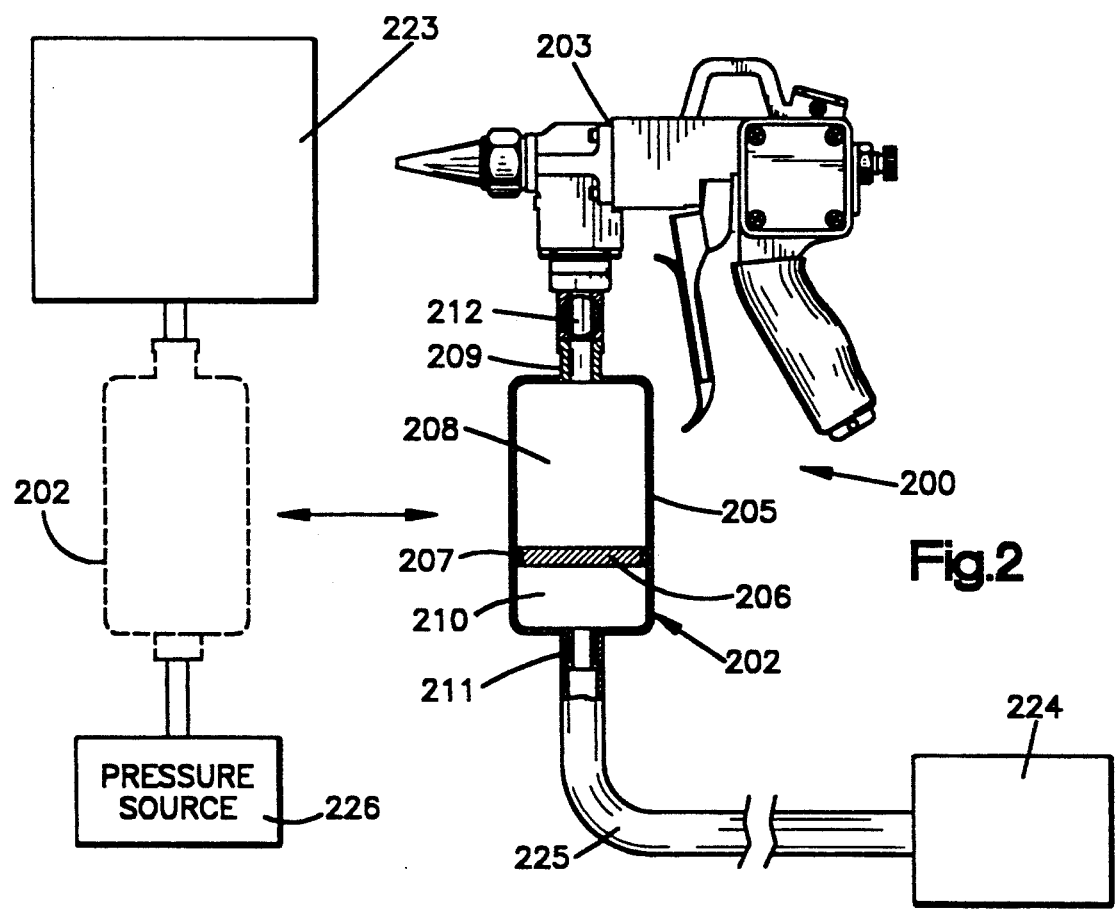
FIG. 2 is a schematic diagram similar to FIG. 1 showing a second embodiment of the invention.

The useful capacity of the cartridge can be increased by connecting the cartridge to an external source of high pressure fluid as shown in FIG. 2. The use of an external pressure source not only increases the useful capacity of the cartridge, it also provides a constant force on the piston and produces a more uniform dispensing pressure. Using the system 200 of FIG. 2, a pressurized air or gas source 224 is connected to the chamber 210 and is used to maintain pressure on the material/gas solution in the cartridge 202 and to force the solution from the cartridge to the dispensing head 203. Instead of using a fixed amount of gas sealed within the chamber 20, as in FIG. , the port 211 is connected to a pressure line which is, in turn, connected to an available source of pressurized air or gas, such as a container of liquid nitrogen or a high-pressure air compressor. The pressure source 4 is then used to maintain pressure in the chamber 20 and to hold force on the piston 206 to maintain the material/gas solution in the chamber 208 under pressure and to expel the solution from the cartridge 202 to the dispensing head 203.

The cartridge 202 of FIG. 2 is identical to the cartridge 102 of FIG. 1, with an outer cylinder 205 and an inner piston 206 defining chambers 208 and 210, except that the port 211 of the cartridge 202 is connected to the pressure source 224 by means of the pressure line 225. Using the external pressure source 224 of FIG. 2, the useful capacity of the cartridges 202 can be increased. During the filling of each cartridge 202, the piston 206 can be moved further toward the end of the cylinder and the chamber can be reduced to nominal volume since an external air or gas source is used to pressurize the chamber 21 instead of the pressurized gas left in the chamber 20.

The cartridge 202 is filled in a manner similar to the cartridge except that since the chamber 210 is not sealed, it is necessary to provide another external pressure source 226 connected to the port 21 during the filling of the cartridge as shown in FIG. 2. The pressure source 226 maintains pressure in the chamber 2 and force on the piston 206 during filling to maintain the material/gas solution in the chamber 208 under pressure while the cartridge 202 is being filled. A pressure relief valve may be provided in the port 211 to maintain the pressure in the chamber 210 above soluability pressure necessary to maintain the gas in solution.

Figure 9:
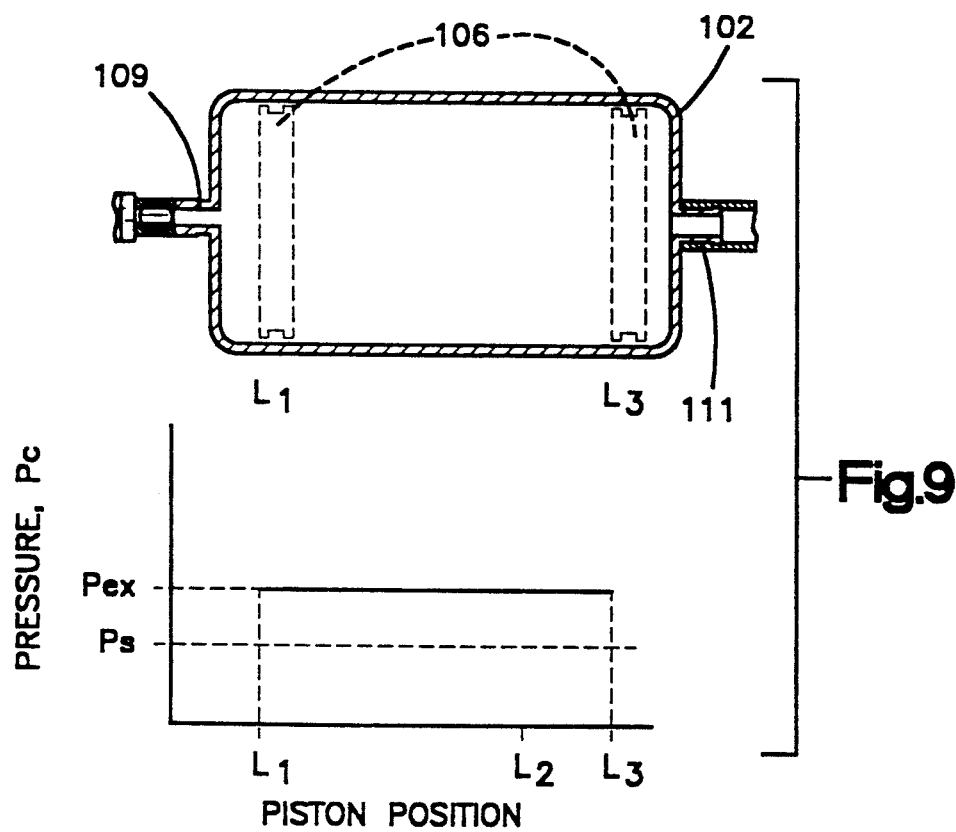
FIG. 9 is a graph similar to FIG. 8 showing the effect of filling the cartridges or containers for the embodiments of FIGS. 2, 4 and 6.

The effect of using the constant pressure source can be seen with reference to FIG. 9. The pressure of the material/gas solution in the chamber 208 is again represented by $P_c$, and the pressure in the chamber 2 is approximately the same since the movable piston 206 allows the pressures in the chambers 28 and 210 to approach equilibrium. Since the chamber 210 is connected to the external pressure source 224, the pressure in the chamber 20 remains at approximately P, and the pressure in the chamber 208 is also approximately P. Before the cartridge 202 is charged with the material/gas solution, the chamber 208 is at a minimal volume, the piston 206 is at position $l_1$, and the chamber 208 contains a minimal amount of solution at pressure $P_{ex}$. Again, it is important that $P_{ex} > P_s$, where $P_s$ is the pressure required to maintain the foaming gas in the material/gas solution. As the chamber 208 fills with the solution, the chamber 208 increases in volume, and the piston 206 moves from position $l_1$ past position $l_2$ to position $l_3$. The chamber 210 decreases in volume, but since it is connected to the external pressure source 224, the chamber 20 remains at pressure $P_{ex}$. Furthermore, since it is not necessary to maintain a sealed amount of gas in the chamber 210, the piston 206 can move all the way to location $l_3$, fully minimizing the volume of the chamber 210, and fully maximizing the volume of the chamber 208. During dispensing, solution is discharged from the chamber 208, the volume of the chamber 208 decreases, and the piston moves from position $l_3$ to position $l_1$, while the pressure remains at $P_{ex}$. As may be appreciated, since the pressure in the chamber 208 remains constant, the material/gas solution is dispensed more uniformly.

The use of the external pressure source 224 increases the useful capacity of the cartridges 202 since each cartridge can be filled with additional solution, and there is no longer a need for maintaining a self-contained pressurized chamber 210 within the cartridge. However, the connection to the air or gas source limits the portability of the system 200 somewhat and requires that source of pressurized air or gas, such as bottled gas or a high-pressure air compressor, be available at the location where the foam is being applied.

To increase the supply of material/gas solution further, a larger container 302 can be used as shown by the system 300 of FIG The container 302 is less portable than the cartridge 102, but contains a larger supply of material/gas solution and thus requires replacement less often. The dispensing head 303, which is essentially identical to the dispensing head 03, is connected to the container 302 by a transfer hose 34 Which may be of any suitable length and construction. The material/gas solution is discharged from the container 302 under pressure and fed to the dispensing head 303, still under pressure, through the transfer hose 304. The hose 304 is made of an acceptable reinforced material that is capable of holding the pressurized material/gas solution. At the dispensing head 303, the solution is dispensed to form the foam, in the same manner as with the dispensing head 103.

The container 302 is generally similar in design to the cartridge 102, but larger in dimensions. The container 302 includes an outer cylinder 305 with an inner movable member or piston 306 having sealing means such as O-rings 307. The piston 306 divides the container 302 into a chamber 308 which is filled with the material/gas solution and a chamber 310 which is filled with a fixed amount of gas to maintain force on the piston 306 and to maintain pressure on the chamber 308. A port 3 is provided adjacent to the chamber 310 for the introduction of the gas into the chamber 310 and an inlet/outlet port 309 is provided at the other end of the cylinder 305 through which the material/gas is fed into the cylinder 305 from the supply source and through which the material/gas solution is discharged. One end of the transfer hose 304 is connected to the port 309, and the other end of the transfer hose is connected to the port of the dispensing head 303.

Although the container 302 needs to be replaced less often than the cartridge 102 of FIG. , the container 302 is replaced and refilled in the same manner as the cartridge 102. The container 302 can be used until it is entirely spent as previously described with respect to the cartridge 102, but this results in a large residual amount of foamed material in the transfer hose 304 which must be purged When the new container is connected. Preferably, the material/gas solution is dispensed from the container 302 only until the pressure in the chamber 308 nears the soluability pressure of the solution, at which time the dispensing is halted through the use of check valves or other means as previously described with respect to the cartridge 2. These check valves would include a check valve at the connection of the transfer hose 304 to the port 309 to seal the transfer hose 304 and the dispensing head 303 to maintain the solution therein under pressure and keep the gas in solution.

Figure 4:
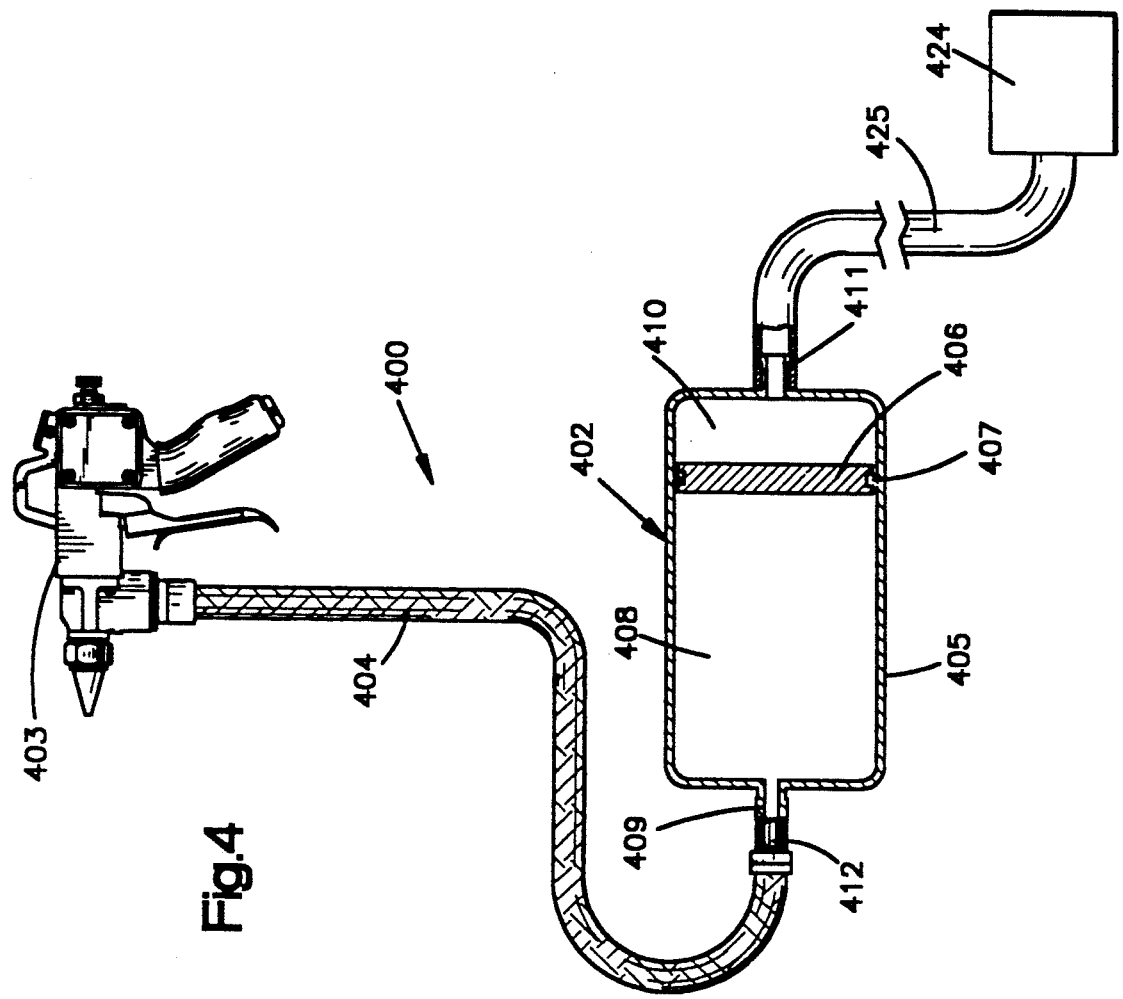
FIG. 4 is a schematic diagram similar to FIG. 3 showing a fourth embodiment.
Figure 3:
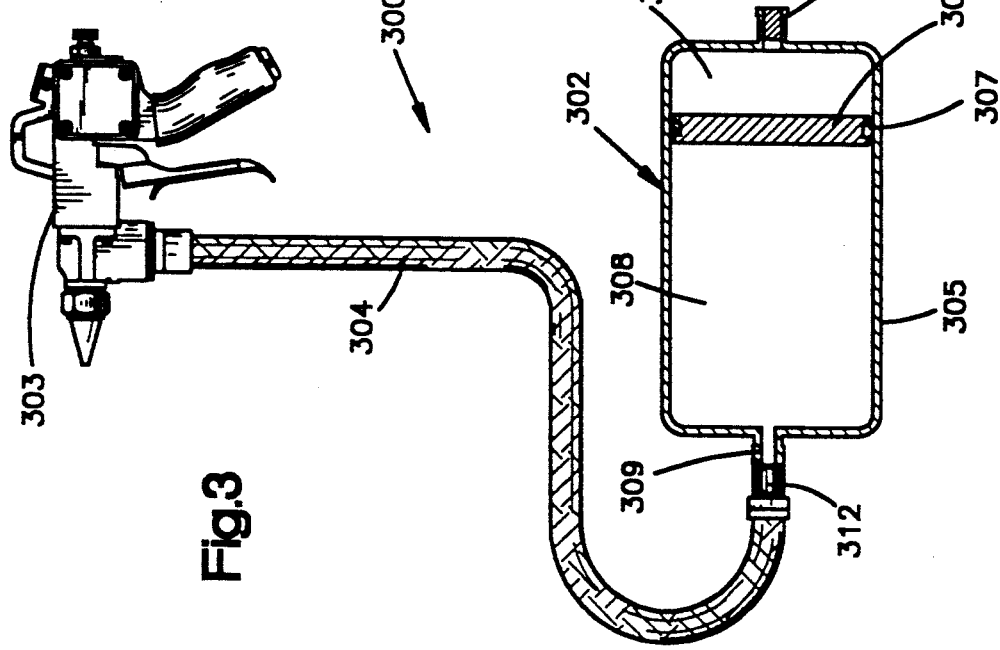
FIG. 3 is a schematic diagram similar to FIG. 1 showing a third embodiment.

As with the system 20, the system 30 may be modified to use an external air or gas source as shown by the system 400 of FIG. 4. The system 400 uses a dispensing head 403 connected by a transfer hose 4 to a container 402 which is essentially the same as the container 302 with an outer cylinder 405, inner piston 406 and chambers 408 and 410. As with the cartridge 202, the container 40 is connected to an available source 424 of pressurized air or gas using a pressure line 25. The use of the pressure source 424 increases the useful capacity of the container 402.

Figure 5:
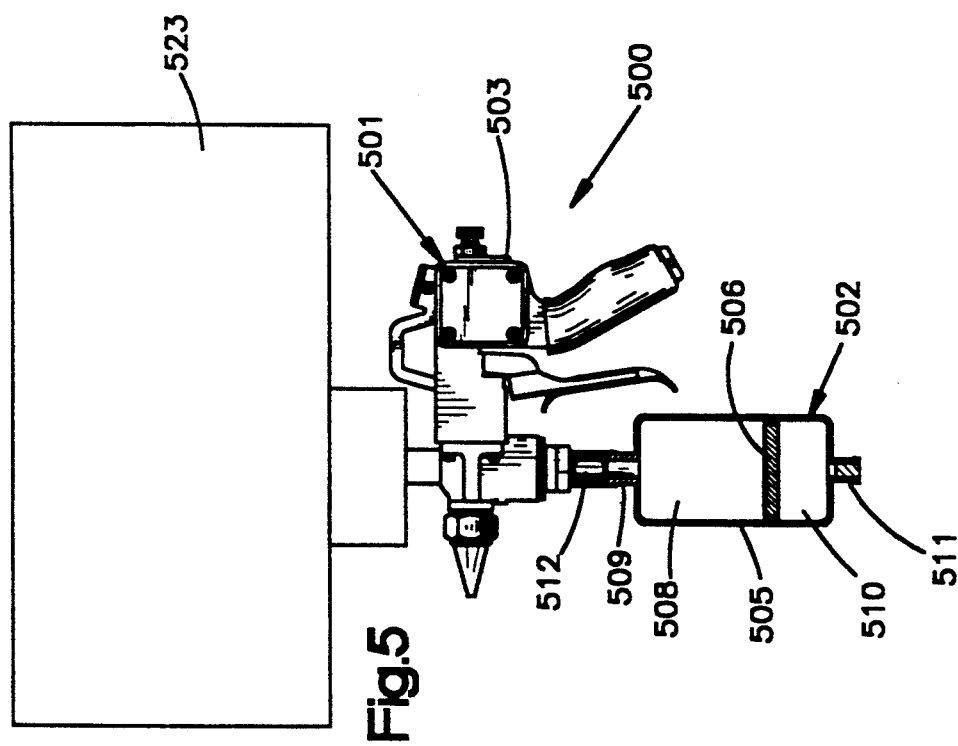
FIG. 5 is a schematic diagram similar to FIG. 1 showing a fifth embodiment.

Another embodiment of the system of the present invention is the system 5 is shown in FIG. 5. Using the system 500, a source of material/gas solution may be provided near the location at which the foam is being dispensed. The supply source, which may be similar to that described in U.S. Pat. No. 4,778,631, provides a docking station 523. The docking station 523 comprises a solution generating system such as the Nordson Foammix ® system to supply the material/gas solution as needed and is capable of being removably connected to a portable satellite gun 501. The satellite gun 501 includes a container 502 which is essentially the same as the cartridge 102 with an outer cylinder 50, and an inner piston 506 defining chambers 508 and 510, and a dispensing head 503 which is similar to the dispensing head 103. The satellite gun 501 may be used in the same manner as the system 100 of FIG. 1, except that, when the container 502 is depleted, the satellite gun 501 is reconnected directly to the docking station 523 to replenish the container 102 so that the satellite gun 501 can continue to be used. Using the system 500, it is not necessary that the container 502 be removable from the dispensing head 503, since the container is refilled while attached to the dispensing head by connection of the dispensing head directing to the docking station.

Figure 6:
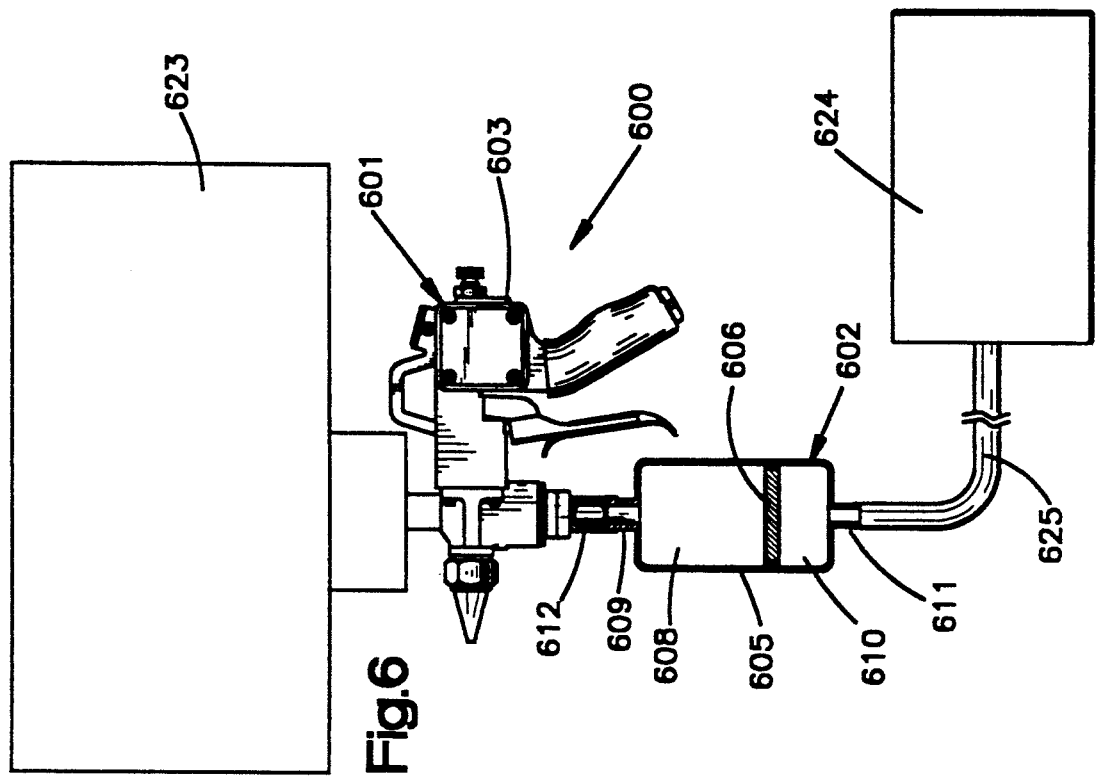
FIG. 6 is a schematic diagram similar to FIG. 5 showing a sixth embodiment.

As with the system 100, the system 500 can be modified as shown by the system 600 in FIG. 6, so that the container 602 of the satellite gun is connected to an available source 624 of pressurized air or gas by means of a pressure line 625. The system 600 includes a docking station 623 that is essentially the same as the docking station 523, and a portable satellite gun 601. The satellite gun 601 differs from the satellite gun 501 in that it is connected to an external source 624 of pressurized gas by a line 625, similar to the cartridge 202. The satellite gun 601 is otherwise similar to the satellite gun 501 with a dispensing head 603 and a container 602 having an outer cylinder 605 and an inner piston 606 forming chambers 608 and 60. As with the system 200, the connection to the external pressure source 624 increases the useful capacity of the satellite gun 601 and allows the gun to be used longer before it must be reconnected to the docking station 623. The connection to the external pressure source 624 also permits the material/gas solution to be dispensed at a constant pressure.

Various modifications can be made to the embodiments disclosed above. For example, in place of using pressurized fluid in the chambers 110, 210, 310, 410, 510 or 610, force on the piston can be provided by use of a suitable spring, motor, hydraulic system, or other similar means.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiment herein shown and described nor in any other way this is inconsistent with the extent to which the progress in the art has been advance by the invention.

What is claimed is:

1. A method of dispensing a foam which comprises the steps of:
    supplying a pressurized source of a material containing gas dissolved in solution;
    providing a portable container having a movable member defining an expandable chamber;
    maintaining a force on the movable member;
    filling the chamber with the material/gas solution from the source;
    maintaining the material/gas solution under pressure in the container to avoid premature foaming of the solution by the utilization of said force on the movable member at all times while the material/gas solution is in the container;
    discharging the material/gas solution from the container; and
    dispensing the solution to atmospheric pressure and allowing the gas to leave the solution to release the gas forming a foam.

2. The method of claim 1, comprising the additional step of:
    refilling the container with the material/gas solution from the source after dispensing the solution to dispense additional solution.

3. The method of claim 2, wherein the container is refilled while connected to a dispensing head.

4. The method of claim 1, wherein the solution is discharged through a dispensing head which is connected to the container.

5. The method of claim 4, wherein the solution is discharged through a dispensing head which is mounted on the container.

6. The method of claim 4, wherein the solution is discharged through a dispensing head that is connected to the container by a hose.

7. The method of claim 1, wherein said force is maintained on the movable member by providing a second chamber on the other side of the movable member from said expandable chamber and by filling the second chamber with fluid.

8. The method of claim 7, wherein said force is maintained on the movable member by providing in the second chamber a controlled amount of fluid which is compressed by movement of the movable member as the expandable chamber is filled with material/gas solution from the source.

9. The method of claim 7, wherein said force is maintained on the movable member by connecting the second chamber to a source of pressurized fluid.

10. A method of dispensing a foam which comprises the steps of:
    connecting a portable container to a source of a material containing gas dissolved in solution;
    filling the container with the material/gas solution from the source;
    providing pressure in the container during the filling to maintain the material/gas solution under pressure;
    halting the filling of the container and disconnecting the portable container from the source while maintaining material/gas solution in the container under pressure;
    connecting the container to a dispensing head through a connection;

dispensing the material/gas solution from the container through the dispensing head and allowing the gas to leave the solution to form a foam; and
providing pressure on the material/gas solution during dispensing to avoid premature foaming of the solution.

11. The method of claim 10, wherein the connection between the container and the dispensing means is vented while the container is filled with material/gas solution from the source.

12. The method of claim 10, comprising the additional step of maintaining pressure in the connection between the container and the dispensing means while filling the container with material/gas solution from the source.

13. The method of claim 10, wherein pressure is provided in the container during the filling and pressure is provided on the material/gas solution during dispensing by providing a movable member in the portable container to define an expandable chamber for the material/gas solution and by maintaining a force on the movable member.

14. Apparatus for dispensing a foam from a pressurized source of a material containing gas dissolved in solution, the apparatus comprising:
a portable container having a movable member defining an expendable chamber;
means for connecting the container to the source to fill the chamber with the material/gas solution;
means for maintaining a force on the movable member and for maintaining the material/gas solution under pressure in the expandable chamber to avoid premature foaming of the solution at all times while the material/gas solution is in the container;
means for dispensing the solution from the container and allowing the solution to reach atmospheric pressure to allow the gas to leave the solution and to release the gas and form a foam;
means for conveying the solution from the container to the dispensing means while maintaining the material/gas solution under pressure.

15. The apparatus of claim 14, wherein the dispensing means includes a hand-held gun which is connected to the container.

16. The apparatus of claim 15, wherein the gun is mounted on the container.

17. The apparatus of claim 15, comprising in addition hose means for connecting the gun to the container.

18. The apparatus of claim 14, wherein the portable container includes a second chamber on the other side of the movable member from said expandable chamber, the second chamber adapted to be filled with fluid.

19. The apparatus of claim 18, wherein the second chamber contains a controlled amount of fluid which is compressed by movement of the movable member as the expandable chamber is filled with material/gas solution from the source.

20. The apparatus of claim 1, comprising in addition a source of pressurized fluid; and
means for connecting the second chamber to the source of pressurized fluid to maintain force is maintained on the movable member.

21. The apparatus of claim 14, wherein the means for dispensing the solution from the container and the means for connecting the container to the source are both included in a hand-held gun that is mounted on the container.

22. Apparatus for dispensing a foam comprising:
a portable container;
first means for connecting the container to a source of a material containing gas in solution;
means for filling the container with the material/gas solution from the source;
first means for providing pressure in the container during the filling to maintain the material/gas solution under pressure;
means for halting the filling of the container while maintaining material/gas solution in the container under pressure;
means for dispensing the material/gas solution from the container and allowing the gas to be released from the solution to form a foam;
second means for connecting the container to the dispensing means; and
second means for providing pressure on the material/gas solution during dispensing to maintain the material/gas solution under pressure while it is being dispensed to avoid premature foaming of the solution.

23. The apparatus of claim 22, wherein the second connecting means is vented while the container is being filled with material/gas solution from the source.

24. The apparatus of claim 22, comprising in addition means for maintaining pressure in the second connecting means while the container is being filled with material/gas solution from the source.

25. The apparatus of claim 22, wherein the first and second pressure providing means include a movable member within the container defining an expandable chamber for the material/gas solution and means for maintaining a force on the movable member.

26. A portable container for holding and dispensing material containing gas dissolved in solution, which comprises:
an outer housing;
a movable member within the housing defining an expandable chamber;
inlet means for connecting to the expandable chamber to a pressurized source of the material/gas solution to fill the expandable chamber with the solution;
means for avoiding premature foaming of the material/gas solution in the expandable chamber by maintaining force on the movable member and maintaining the material/gas solution under pressure at all times while the material/gas solution is in the container; and
outlet means for discharging the solution from the expandable chamber while maintaining the solution under pressure; and
means for connecting the discharging means to a dispenser to permit the solution to be dispensed to atmospheric pressure to release the gas and form a foam.

27. The portable container of claim 26, comprising in addition means for connecting the outlet means to a dispensing head.

28. The portable container of claim 27, wherein the connecting means includes means for mounting the dispensing head on the container.

29. The portable container of claim 26, wherein the movable member also defines a second chamber on the other side of the movable member from said expandable chamber, and wherein the second chamber is sealable for containing a predetermined amount of fluid therein.

30. The portable container of claim 26, wherein the movable member also defines a second chamber on the other side of the movable member from said expandable chamber, and comprising in addition means for connecting the second chamber to a source of pressurized fluid.

* * * * *

UNITED STATES PATENT AND TRADEMARK OFFICE
CERTIFICATE OF CORRECTION

PATENT NO. : 5,318,207
DATED : June 7, 1994
INVENTOR(S) : George O. Porter et al.

It is certified that error appears in the above-indentified patent and that said Letters Patent is hereby corrected as shown below:

Column 4, line 36, after "to" insert --be--

Column 4, line 45, delete "6" and insert --116--

Column 5, line 25, delete "Volume" and insert --volume--

Column 5, line 39, after "chamber" insert --110--

Column 6, line 33, delete "P$_2$" insert --P$_S$--

Column 7, line 1, delete "20" and insert --210--

Column 7, line 1, after "Fig" insert --1--

Column 7, line 2, after "line" insert --225--

Column 7, line 5, delete "4" and insert --224--

Column 7, line 6, delete "20" and insert --210--

Column 7, line 21, delete "21" and insert --210--

Column 7, line 22, delete "20" and insert --210--

Column 7, line 24, after "cartridge" insert --102--

Column 7, line 26, delete "21" and insert --211--

Column 7, line 28, delete "2" and insert --210--

Column 7, line 38, delete "2" and insert --210--

Column 7, line 40, delete "28" and insert --208--

UNITED STATES PATENT AND TRADEMARK OFFICE
CERTIFICATE OF CORRECTION

PATENT NO. : 5,318,207
DATED : June 7, 1994
INVENTOR(S) : George O. Porter et al.

Page 2 of 3

It is certified that error appears in the above-indentified patent and that said Letters Patent is hereby corrected as shown below:

Column 7, line 43, delete "20" and insert --210--

Column 7, line 43, delete "P" and insert --P ex--

Column 7, line 44, delete "P" and insert --P ex--

Column 7, line 56, delete "20" and insert --210--

Column 8, line 13, after "Fig" insert --3.--

Column 8, line 17, delete "03" and insert --103--

Column 8, line 18, delete "34" and insert --304--

Column 8, line 18, delete "Which" and insert --which--

Column 8, line 36, delete "3" and insert --311--

Column 8, line 47 after "Fig. insert --1--

Column 8, line 53, delete "When" and insert --when--

Column 8, line 59, delete "2" and insert --102--

Column 8, line 65, delete "20" and insert --200--

Column 8, line 65, delete "30" and insert --300--

Column 8, line 68, delete "4" and insert --404--

Column 9, line 4, delete "40" and insert --402--

UNITED STATES PATENT AND TRADEMARK OFFICE
CERTIFICATE OF CORRECTION

PATENT NO. : 5,318,207
DATED : June 7, 1994
INVENTOR(S) : George O. Porter et al.

It is certified that error appears in the above-indentified patent and that said Letters Patent is hereby corrected as shown below:

Column 9, line 5, delete "25" and insert --425--

Column 9, line 9, delete "5" and insert --500--

Column 9, line 20, delete "50" and insert --505--

Column 9, line 27, delete "102" and insert --502--

Column 9, line 35, after "gun" insert --601--

Column 9, line 46, delete "60" and insert --610--

Claim 14, line 5, delete "expendable" and insert --expandable--

Claim 20, line 1, delete "1" and insert --18--

In the Abstract:
   Line 5, after "location" insert --.--
   Line 9, after "location" insert --.--

Signed and Sealed this

Fourth Day of October, 1994

Attest:

BRUCE LEHMAN

*Attesting Officer*        *Commissioner of Patents and Trademarks*